US011271469B2

(12) United States Patent
Khachaturov

(10) Patent No.: US 11,271,469 B2
(45) Date of Patent: Mar. 8, 2022

(54) DEVICE AND METHOD FOR SUPPRESSING HARMONIC DISTORTIONS AT THE OUTPUT OF VARIABLE FREQUENCY DRIVE

(71) Applicant: Dmytro Khachaturov, Kharkov (UA)

(72) Inventor: Dmytro Khachaturov, Kharkov (UA)

(*) Notice: Subject to any disclaimer, the term of this patent is extended or adjusted under 35 U.S.C. 154(b) by 76 days.

(21) Appl. No.: 16/728,206

(22) Filed: Dec. 27, 2019

(65) Prior Publication Data
US 2020/0373828 A1    Nov. 26, 2020

(30) Foreign Application Priority Data
May 20, 2019 (UA) .............................. u 201905283

(51) Int. Cl.
*H02M 1/12* (2006.01)
*H02J 3/01* (2006.01)

(52) U.S. Cl.
CPC ............... *H02M 1/126* (2013.01); *H02J 3/01* (2013.01)

(58) Field of Classification Search
CPC ................................. H02M 1/126; H02J 3/01
See application file for complete search history.

(56) References Cited

U.S. PATENT DOCUMENTS

| | | | |
|---|---|---|---|
| 5,668,418 A * | 9/1997 | Carlsson ................... | H02J 3/01 307/105 |
| 2013/0038139 A1* | 2/2013 | Shudarek .............. | H01F 27/255 307/105 |
| 2015/0092459 A1* | 4/2015 | Bergdahl .................. | H02J 3/01 363/39 |

* cited by examiner

*Primary Examiner* — Peter M Novak

(57) ABSTRACT

A device for suppressing harmonic distortions at the output of variable frequency drive (VFD) comprising at least one passive harmonic filter (PHF) which has a set of storage elements and a set of inductive elements. The set of inductive elements are mounted on a magnetic core. The PHF comprising at least two lines connected in parallel (parallel lines) with similar sets of elements. The described technical solution expands the possibility of operating the VFD/VSD with different supply voltage frequencies, and maintains the THD/TDD values within 5% regardless of active power fluctuations.

9 Claims, 6 Drawing Sheets

DEVICE AND METHOD FOR SUPPRESSING HARMONIC DISTORTIONS AT THE OUTPUT OF VARIABLE FREQUENCY DRIVE

FIELD OF THE INVENTION

The present invention relates to electrical power distribution systems and more particularly to filters for suppressing harmonic current distortions in such systems.

BACKGROUND OF THE INVENTION

Description of the Related Art

It is well known to those skilled in the art that non-linear load causes harmonic current distortions of a supply voltage due to higher order harmonics, such as the 5th, 7th, 11th, 13th, etc. in three-phase circuits.

The higher order harmonics of power supply systems are becoming a reason of the voltage shape distortion on a supply transformer bus, which leads to increases the energy loss in supply networks, causes premature aging of a motor insulation and cables, thereby reducing the reliability and durability of electrical equipment. That is why in many countries state standards have been introduced. Such standards regulate the acceptable levels of harmonic voltage distortions (THD—total harmonic distortion) caused by current of supply systems and other loads.

Electrical distribution systems used in an oil field or industrial facility, are supplying energy to non-linear loads, such as adjustable speed motor drives of submersible electric motors or other similar loads. Such loads are producing various current levels depending on harmonic frequency of the power distribution system with the higher order harmonics depending on the nature of the load.

It is known that higher levels of Total Harmonic Distortion (THD)/Total Demand Distortion (TDD) can reduce efficiency of Artificial Lift installation. The higher order harmonics of the sideline also effects on a surface equipment within an electric power distribution network.

Some examples of downhole and underground systems are described in the patent documents: U.S. Pat. No. 115,401, U.S. Pat. No. 118,287, U.S. Pat. No. 118,520, RU2615775, as well as patent applications WO/2019/108160, US20170284177A1 and US20190069441A1.

By increasing a number of drilled oil wells the quality of current distribution systems and higher order harmonics mitigation becomes more important. According to IEEE 519, for Electric Power Systems it is suggested to keep THD/TDD levels as low as possible and becomes a responsibility of a system owners, operators, and users.

United States patent application (No. US 2006/0197385 A1, H02J 1/02, 2006.07.09) sets out, a harmonic mitigating device for connection between a power distribution system and the load uses a magnetic shunt to control the levels of magnetic coupling between different elements of the device while providing all windings on a single core. A magnetic core having three core legs, each corresponding with one of three phases of the power distribution system. At least one magnetic shunt, extending across and magnetically coupled to the core legs at an intermediate part thereof, such that first and second parts of the core on either side of the shunt. For each phase, a first reactive element comprising a line winding having a first end for connection to a first line and a second end, the line winding being disposed on the first part of the core. For each phase, a second reactive element comprises a first cross-link winding, disposed on the second part and having a first end connected to the second end of the line winding and a second end connected to a capacitor, the capacitor having a second end connected to a different phase or to a capacitor associated with a different phase. The line winding and associated cross-link winding for each phase are magnetically coupled by the magnetic shunt.

The disadvantages of the described technical solution consist in increasing of THD up to a level more than 5% when the active load is decreasing of more than 50%.

Also, in the prior art (patent U.S. Pat. No. 9,356,503 filed 2016 May 31, H02J 1/02) sets out a harmonic mitigating device that can include at least the following components: an active filter; a passive filter; c) at least one control switch, wherein at least one control switch operationally controls whether the at least one active filter or at least one passive filter can be utilized by the harmonic mitigation device to mitigate at least one harmonic current flow, and where the at least one control switch operationally switches the harmonic mitigation device from utilizing the at least one active filter to utilizing the at least one passive filter when a current load exceeds a predetermined percent of a full current load.

The disadvantages of the described invention consist in a relatively high coefficient of THD when a load value less than 50% of the nominal, in particular, the THD could be more than 5%. Also, described invention is able to operate on a single frequency power network of 50 or 60 Hz, which is reducing the functionality. The claimed technical solution aims to solving the technical problems, of prior art.

SUMMARY OF THE INVENTION

A technical result, achieved through the implementation of the claimed invention consists in expanding the functionality of the suppressing harmonics unit of the VFD by increasing the range of load changes, as well as providing the operation with different supply voltage frequencies (50/60 Hz).

Even at 40% of nominal load the 515-kva VFD is capable of keeping the THD level less than 5%, while TDD shows around 3.33%. When reaching 70% load, the VFD can already offers less than 4% THD.

A device for—suppressing harmonic distortions of the variable frequency drive (VFD) comprising at least one passive harmonic filter (PHF) which has a set of storage elements and a set of inductive elements. Wherein the set of inductive elements are mounted on a magnetic core. Said PHF comprising at least two lines connected in parallel (parallel lines) with similar sets of elements.

Each of the parallel lines is connected in series with a separate adjustable rectifier of the VFD. At least one of the parallel lines is active depends on operating mode. Each of the parallel lines comprising a set of storage elements with adjustable contactors, for connection/disconnection at least one of said parallel lines depends on operating mode.

At least a part of the each set of storage elements is active, wherein a capacitance of said sets of storage elements is changeable depending on the input voltage supply frequency.

The set of inductive elements of the PHF comprising at least two sets of the inductive elements mounted on separate cores and connected through an input. One of the parallel lines is active when the measured active power is less than 50% of nominal value (half power mode HPM).

The cores of each set of inductive elements contains an upper and a bottom yoke with vertical rods mounted between them. Said vertical rods comprise visible gaps in a cross section, wherein said visible gaps are filled within non-magnetic material. Said visible gaps increase the quality factor of an oscillating circuit, and reducing a dispersion flux.

The cores of each set of the inductive elements are fixed around the perimeter in a frame. Said frame designed with guide elements in a frame base for improving reparability.

The inductive elements of the PHF are installed in a separate compartment of the VFD. Said inductive elements are cooled via forced air cooling.

The PHF is configured to change the operating mode between at least two operating modes depending on measured active power and supply voltage frequency value, wherein at least one of the changed operating modes is the half power mode (HPM). During process of changing of the operating modes the control system of the VFD provides a step-disconnection/connection of adjustable contactors of sets of storage elements.

Said PHF has an operating mode, when the active power is greater than 50% of nominal value (full power mode FPM). In this mode the control system provides precharging of sets of storage elements during the step-connection to the at least one of parallel lines.

Also, the PHF has an operating mode, when the active power is less than 30% of nominal value (power generating mode PGM).

Also said PHF has an operating mode wherein the set of storage elements is formed to change a storing capacity depending on frequency of input current supply (frequency change mode FCM) via connecting an additional capacitor to the set of storage elements by means of the additional adjustable contactor for switching VFD between supply voltage frequencies 60 Hz and 50 Hz.

BRIEF DESCRIPTION OF THE DRAWINGS

The substance of the claimed invention is explained, but not limited by the following drawings:

DETAILED DESCRIPTION OF THE PREFERRED EMBODIMENT

Figure 1:
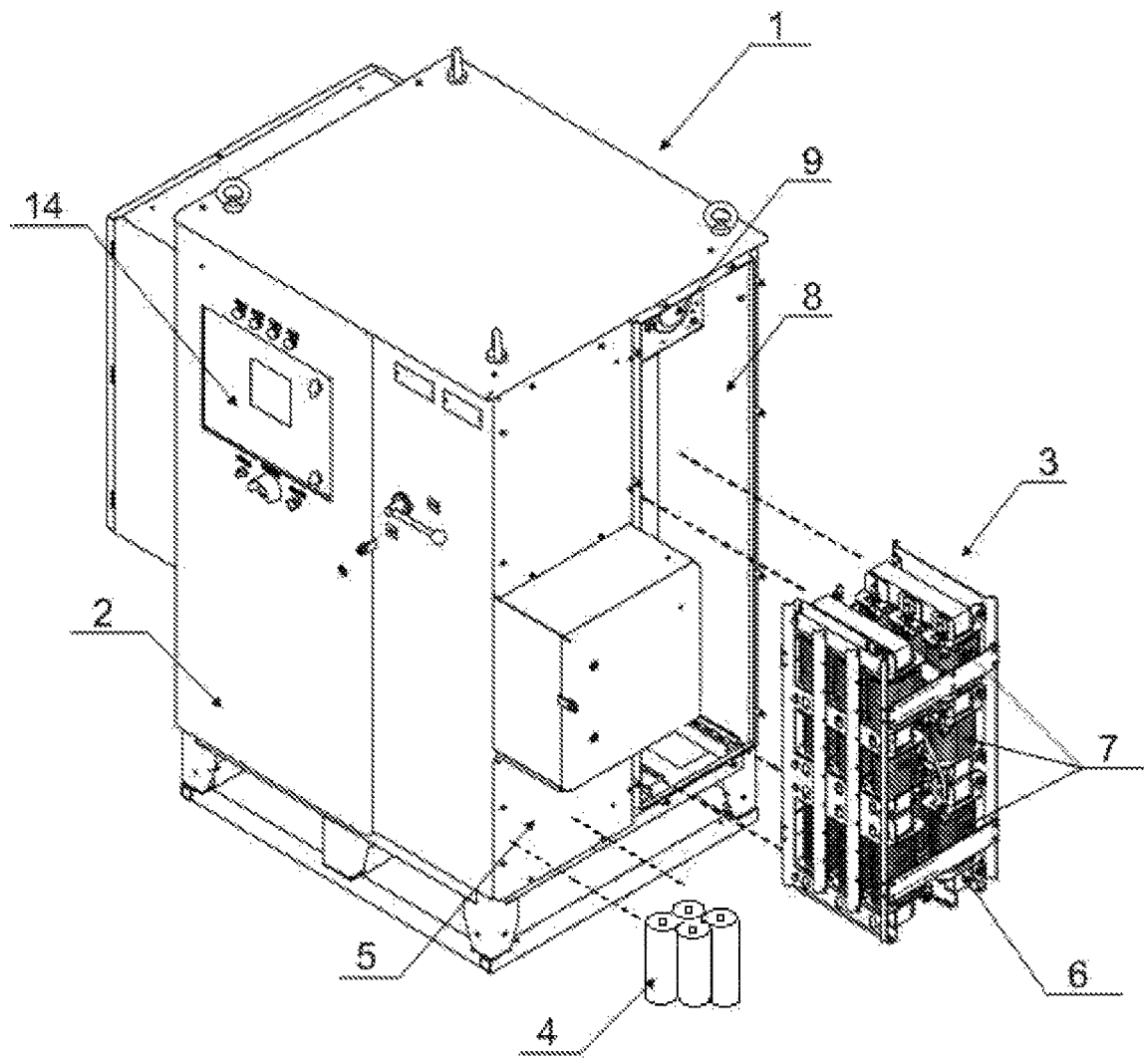
FIG. 1—illustrates a variable frequency drive (VFD) with a harmonic suppression unit named as passive harmonic filter (PHF)

The present invention can be used in variable frequency/speed drives (VFD/VSD) for various power consumers of non-linear load. In order to reduce the negative impact of power consumers on the power supply network, for example by the variable frequency drive (VFD) 1 (FIG. 1) of a submersible motor (not shown in the images). In particular any other frequency-controlled electric motor can be used as a load. A housing 2 of the VFD is divided into compartments of electrical equipment installation and contains a separate space formed as single compartment or few compartments of harmonic suppression device elements.

Figure 2:
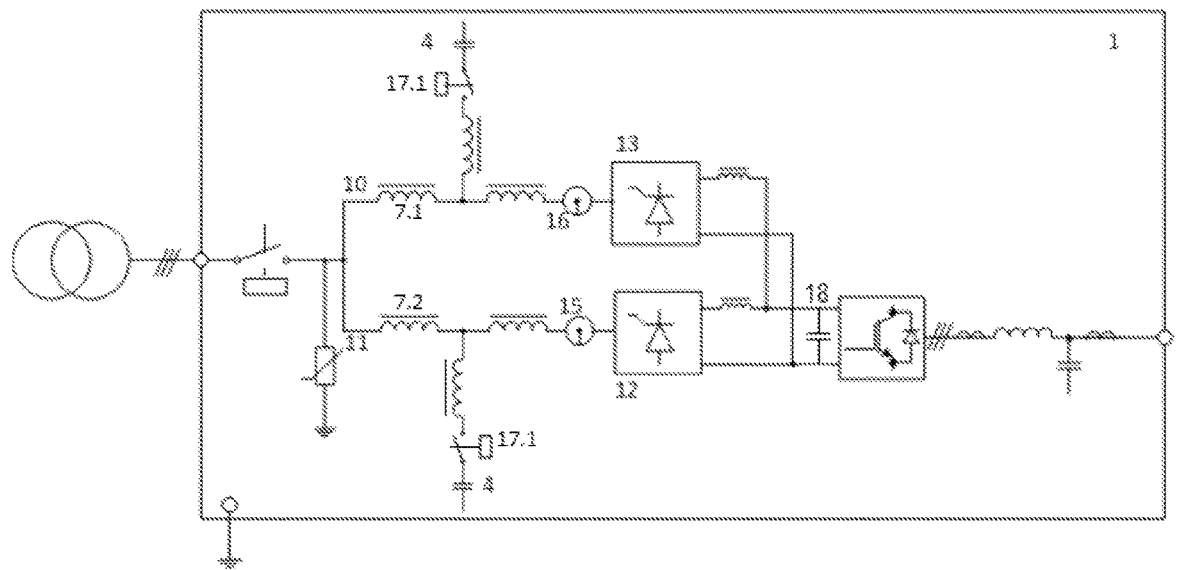
FIG. 2—illustrates a circuit diagram of the VFD.

The harmonic suppressing device 3 is installed within the VFD 1 compartments. The harmonic suppressing device 3 contains at least one passive harmonic filter (PHF) (FIG. 2). Said passive filter configured to suppress higher order harmonics such as the 5th and 7th, as well as other groups of harmonics, depending on the user settings. The PHF comprises a set of storage elements 4 installed within the separate compartment 5 of the VFD which can be designed as capacitor sets 4.2; 4.1.

Said PHF contains inductive elements 7 connected to the sets of storage elements 4. Wherein a first (7.1) and a second (7.2) sets of inductive elements are mounted on a magnetic core 6, designed as a reactor choke.

In three-phase (A;B;C) implementation, the PHF contains at least two sets of inductive elements (7.1; 7.2) (chokes), installed on separate bases designed as magnetic cores and connected through an input.

Each of phase, contains inductive elements 7 with input, output and resonant coils connected in pairs.

Said inductive elements 7 connected to the set of storage elements 4 of each PHF line. The elements of the PHF, in particular chokes, are installed in the separate compartment 8 of the VFD. Said compartment 8 is equipped with a forced air cooling, implemented by at least one fan 9 of the VFD cooling system.

The PHF comprising at least two lines connected in parallel (parallel lines) 10, 11 (FIG. 2-5), each of the parallel lines 10, 11 is connected in series with separate adjustable rectifiers 12,13 of the VFD for example thyristors of the VFD 1. The present invention also allows to use different types of adjustable rectifier in which some of the switches are controllable (thyristors) and some of them are uncontrollable (diodes), (diode-thyristor).

Figure 8:
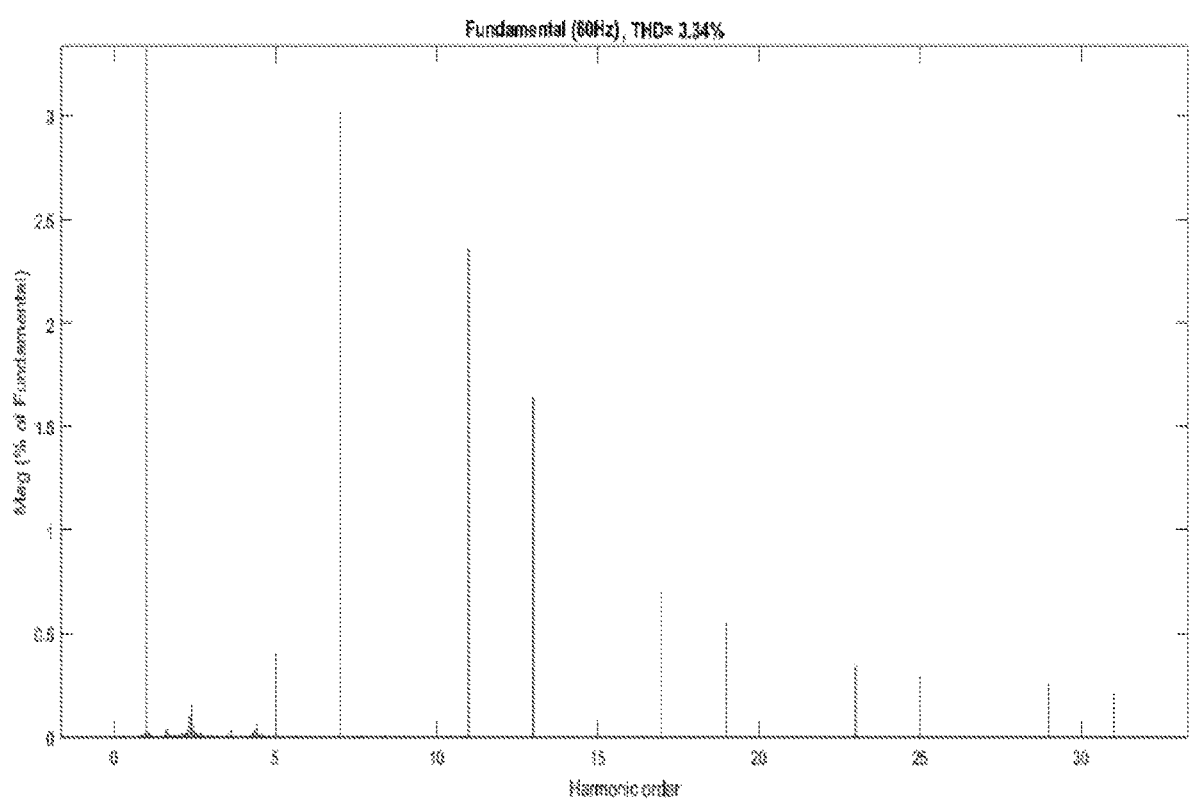
FIG. 8—illustrates THD level in the VFD output.

Said PHF is configured to work with at least one active line 10 or 11 when the measured active power is less than 50% of nominal value. This technical solution allows to keep a value of the coefficient of nonlinear distortion (THD) within 5% when a load drop is more than 50% of the nominal value as shown in the graph (FIG. 8).

Figure 3:
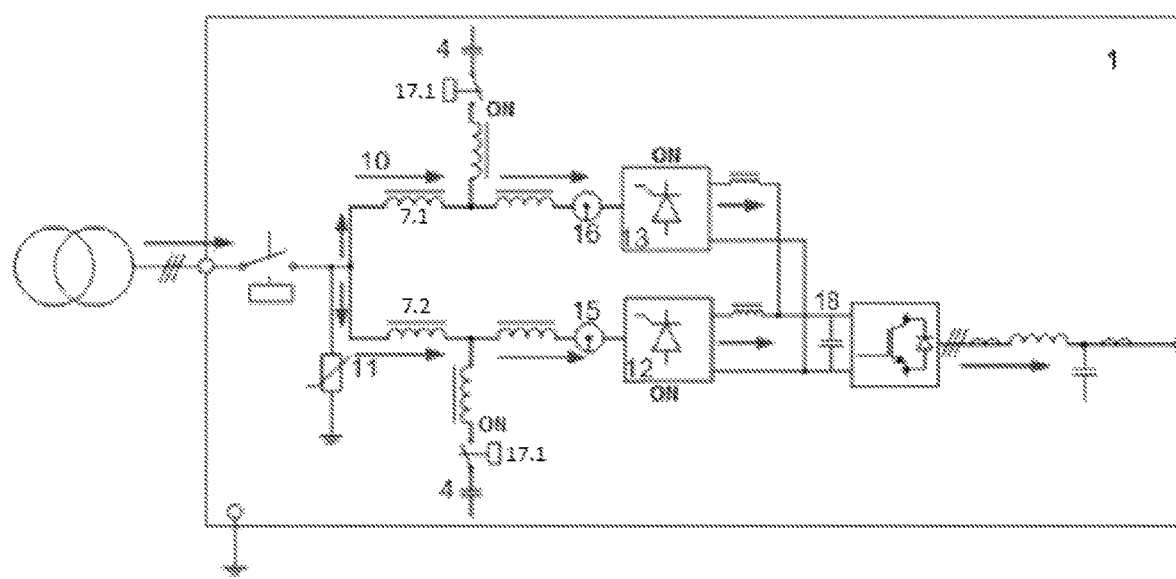
FIG. 3—illustrates a circuit diagram of the VFD in a full power operating mode (FPM)

According to the present invention, an input current is divided between the two parallel lines 10,11 of the harmonic suppression unit (FIG. 3). In this case the rectifier obtained rated active current value is equally to Inom/2.

During the VFD operation the active load current verify in range 1-100% of the nominal value. During the active load current decreasing up to 50%, as a result, Inom=Inom/4, which leads to increasing of THD (TDD) coefficient.

During the VFD operation the controller 14 of the control system takes signals from the sensors 15, 16.

Measured current signals Tap allow to perform an on-line monitoring the active power value.

The VFD control system determines the instantaneous values of active power according to the values of supply voltage and the efficiency of the VFD. VFD control system compares determined values of instantaneous active power with the nominal value.

Said VFD control system providing at least two operating modes of the PHF. There are few the most common operating modes of PHF according to the present invention:
a half power mode (HPM)—a first power mode;
full power mode (FPM)—a second operating mode;
a power generating mode (PGM)—a third operating mode;
a frequency change mode (FCM)—a fourth operating mode;

The half power mode (HPM) is used during the period when control system determines the active power current value decreasing less than permissible value, in particular, more than 50% of the nominal active power value. According to the present invention the permissible value could be set as a range of acceptable values, for example 45-55% of the nominal value.

Figure 4:
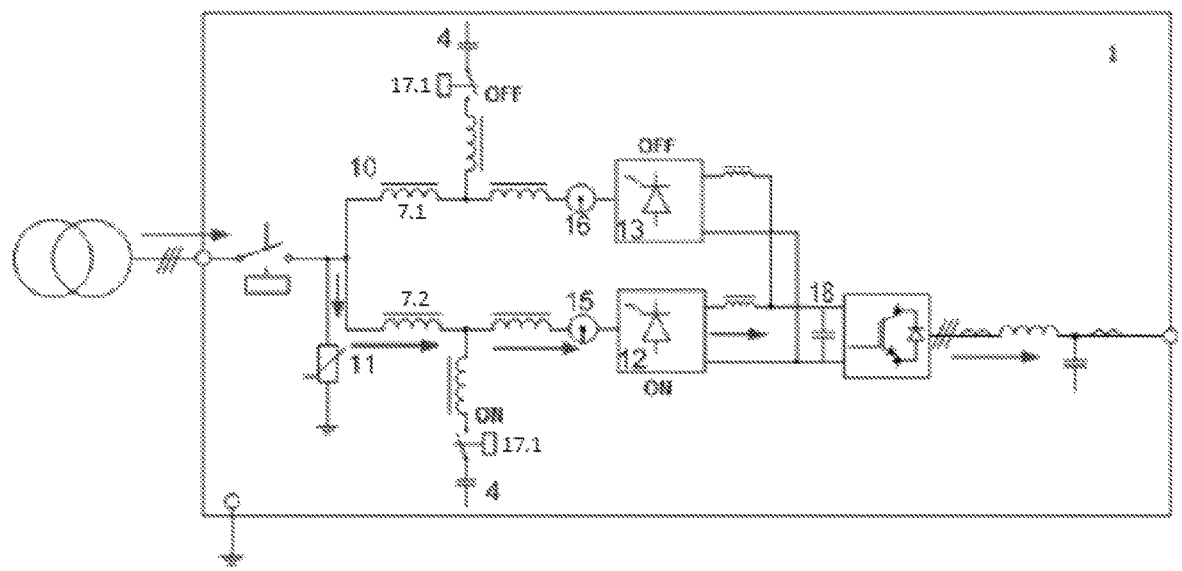
FIG. 4—illustrates a circuit diagram of the VFD in a Half Power Operation mode (HPM)
Figure 5:
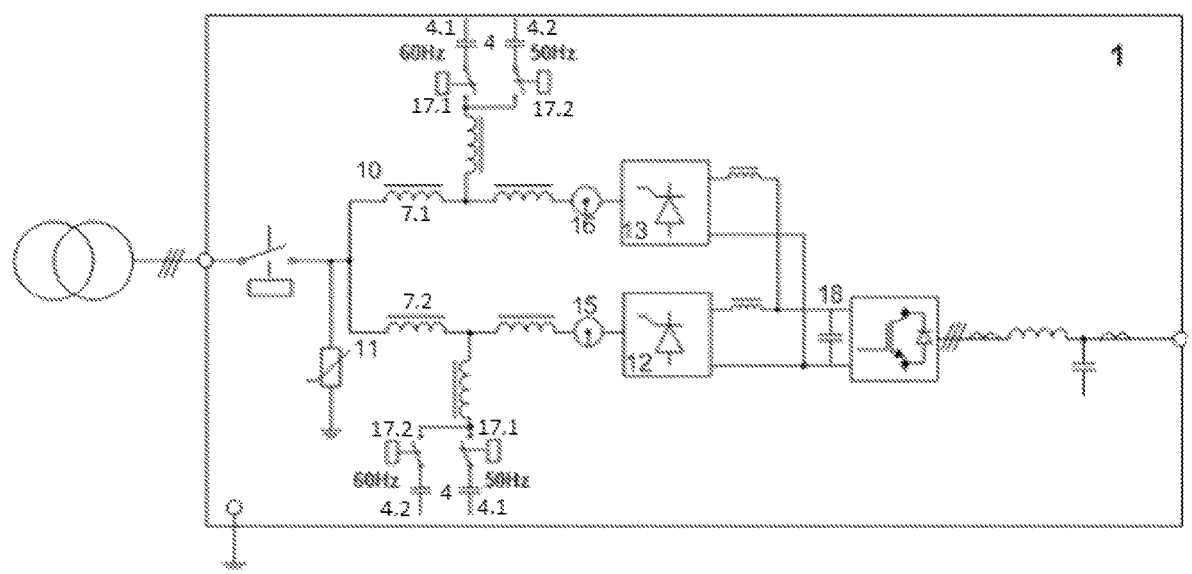
FIG. 5—illustrates a circuit diagram of the VFD in a frequency change mode (FCM)

After determining of the active power decreasing less than permissible value, the controller 14 provides a signal of disconnecting one of the PHF parallel lines 10 or 11, via switching off the adjustable rectifier 12 or 13 of the VFD and a first contactor 17.1 of the set of storage elements 4 (FIG. 4).

Also, could be realized another possible implementation of HPM with a programmable dual-mode contactor installed in the input of the PHF, which disconnect one of at least two parallel lines.

After switching off one of at least two parallel lines 10, the current flows through the line 11 (FIG. 4) with the opened adjustable rectifier 13 (ON). At the moment the active power value is reaching up close to the nominal value with a minimizing of THD coefficient while the VFD is switched to the "Half power mode".

During the HPM the control system continues monitoring the active power current values of the VFD.

When the active power current value is increased above the setting of values, the controller 14 gives a signal "ON" to switch on the adjustable rectifier 13 of the inactive line of at least two parallel lines 10, 11 for continuing the VFD operation in the "Full power mode" (FPM). Also the first adjustable contactor 17.1 is back to close for connecting the set of storage elements 4 (FIG. 3).

Also, the present invention provides "Power generating mode" (PGM). During the PGM the DC link 18 (FIG. 2-5) of the VFD is pre-charging and providing the active power current to at least 30% of the VFD nominal rate power. In this mode, the set of storage elements 4 of at least one of parallel lines is switching out of the circuit (FIG. 5), by switching off the first adjustable contactor 17.1 until the VFD is reaching up the set point of active power current.

After switching on the pulse-width modulation (PWM) and reaching the VFD operating parameters, the sets of storage elements 4 are connecting to the circuit into both of the parallel lines 10, 11 and the VFD switches on the Full Power or Half Power mode, depending on the measured active power current value.

During the process of changing operating modes the VFD control system provides a step-disconnection/connection of adjustable contactors of the storage elements. Also said control system provides precharging of sets of storage elements during the step-connection to the at least one of parallel lines. These features allow protecting DC link 18 of VFD from high voltage sags or voltage surges during transient conditions.

Each of the PHF lines contains the set of storage elements 4 with the first 17.1 and a second 17.2 adjustable contactors (FIG. 5), which are configured to use a part of capacity of the set of storage elements 4 depending on frequency of the supply current network.

In particular, the transfer from supply current network frequency of 60 Hz to frequency of 50 Hz is carried out via connecting the capacitor set 4.2 to each of the parallel lines 10, 11 by means of the second adjustable contactor 17.2.

The described solution leads to unification of the VFD, providing the THD level to 5% or lower, regardless of the different supply voltage frequency (50/60 Hz). Wherein FIGS. 7; 8 are showing the graphs of the characteristics of the present technical solution and the method of the VFD operation according to the results of tests and computer simulation.

Figure 7:
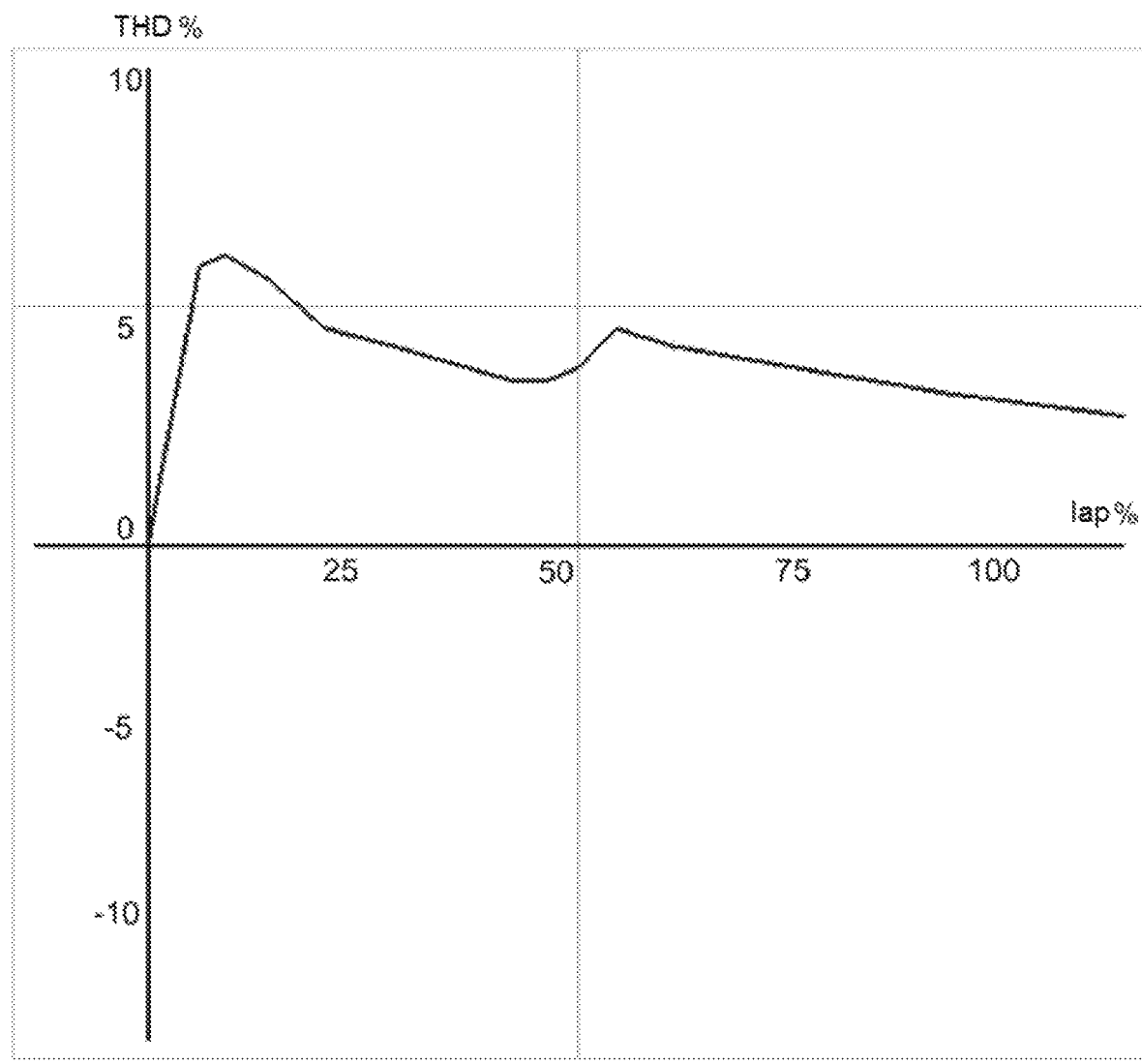
FIG. 7—illustrates a graph of the dependence between the THD in and a load level.

FIG. 7 shows the transfer between the Full and the Half Power modes, wherein THD is less than 5%. FIG. 8 shows the result of the mathematical modeling of the VFD operating, which shows reduced rate of higher order harmonics such as the 5th, 7th to wherein the THD value is 3.34%.

Figure 6:
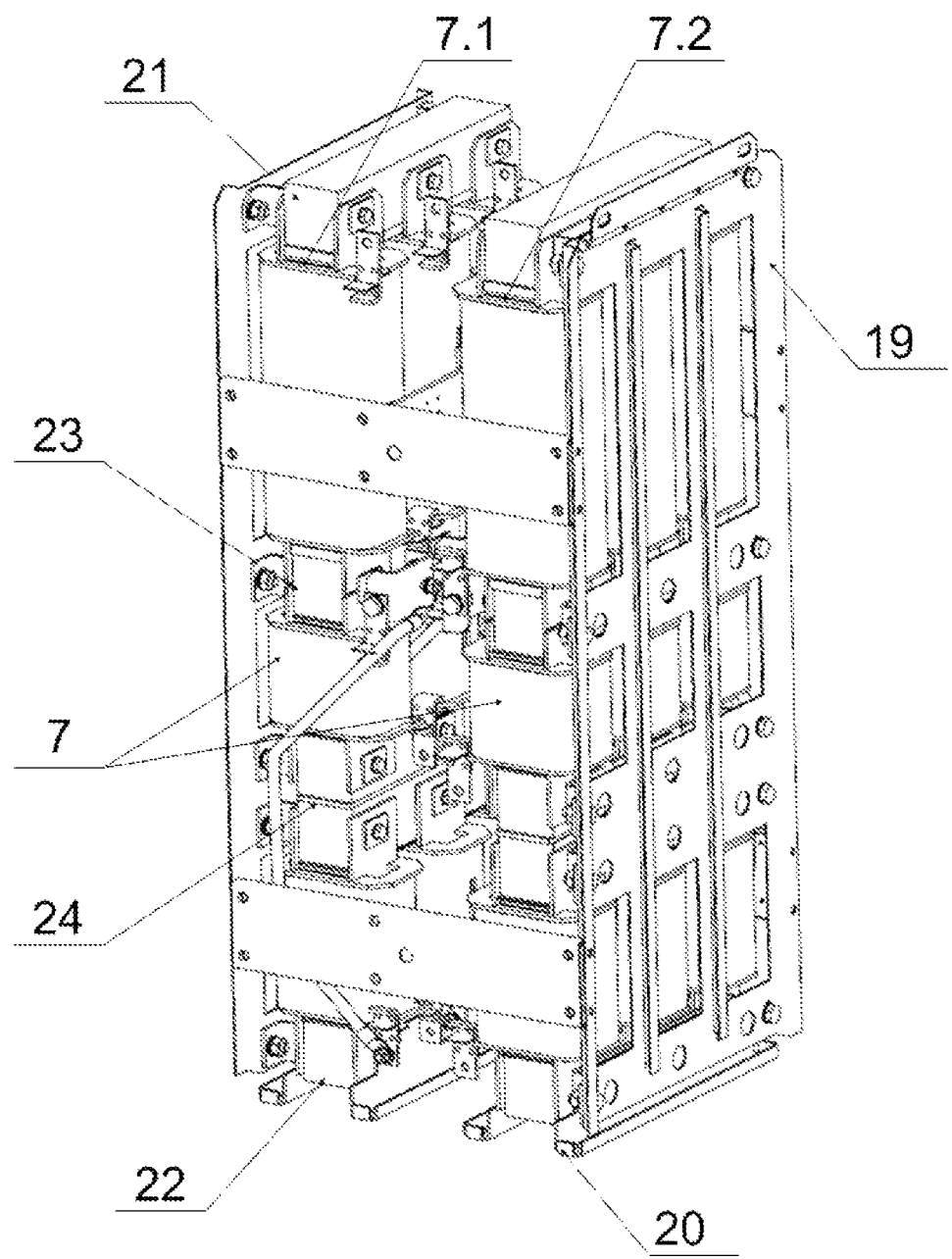
FIG. 6—illustrates an inductive element of PHF.

The design of the PHF inductive element (FIG. 6) provides of installation convenience and maintenance also increases maintainability.

According to the present invention at least two sets of inductive elements 7 (the first set 7.1 and the second set 7.2) are fixed around the perimeter in a frame 19 with guide elements 20 in the frame base. The magnetic cores 6 of each set of inductive elements 7.1; 7.2 contains an upper 21 and a bottom 22 yoke with vertical rods 23 mounted between them. The vertical rods 23 are made with visible gaps 24 in cross section. The visible gaps 24 are filled with non-magnetic material, such as fiberglass or similar. Said visible gaps 24 increased the quality factor of an oscillating circuit, and reducing a dispersion flux.

The present invention can be used for example in different types of six and twelve pulse VFD.

The implementation of the described technical solution expands the possibility of operating the VFD/VSD with different supply voltage frequencies and maintains the THD/TDD values within 5% regardless of active power fluctuations.

What is claimed is:

1. A device for suppressing harmonic distortions at the output of a variable frequency drive (1) (VFD) is designed as a passive harmonic filter (PHF) comprising:
    at least two lines (10; 11) connected in parallel (parallel lines),
    a storage elements set (4) and an inductive elements set (7) for each of parallel lines (10; 11),
        wherein the inductive elements set (7) are mounted on a magnetic structure,
            wherein the inductive elements set (7) of the PHF comprising at least a first (7.1) and a second (7.2) sets of the inductive elements mounted on separate cores (6) and connected through an input,
            wherein the first set (7.1) is connected to a first parallel line (10) and the second set (7.2) is connected to a second parallel line (11), and
            the (7) inductive elements set (7) is installed in a separate compartment (8) of the VFD,
            wherein the inductive elements set (7) is cooled via forced air cooling;
        wherein each of the parallel lines (10; 11) is connected in series with separate adjustable rectifiers (13; 12) of the VFD (1);
        wherein the storage elements set (4) of each parallel line comprising a first (4.1) and a second (4.2) capacitor sets equipped with adjustable contactors (17.1; 17.2),
            wherein at least a part of each storage elements set (4) is active;
            wherein a capacity of the storage elements set (4) of each parallel line (10; 11) is changeable depending on a supply voltage frequency.

2. The device of claim 1 wherein one of the parallel lines (10) or (11) is active when a measured active power current is less than 50% of a nominal value.

3. The device of claim 1 wherein the cores (6) of each inductive elements set (7.1; 7.2) contain an upper (21) and a bottom (22) yoke with vertical rods (23) mounted between them.

4. The device of claim 1 wherein the cores (6) of each inductive elements set (7.1; 7.2) are fixed around the perimeter in a frame (19),
wherein said frame (19) is designed with guide elements (20) in the frame base.

5. A method for suppressing harmonic distortions at the output of a variable frequency drive comprising:
installing a passive harmonic filter (PHF) within the variable frequency drive (VFD) housing (2);
forming the passive harmonic filter (PHF) with:
at least two lines (10; 11) connected in parallel (parallel lines),
wherein each of the parallel lines is connected in series with a separate adjustable rectifier (12; 13) of the VFD,
a storage elements set (4) with a first (4.1) and a second (4.2) capacitor sets equipped with adjustable contactors (17.1; 17.2), and
an inductive elements set (7) with a first (7.1) and a second (7.2) inductive elements sets,
wherein the first set (7.1) is connected to a first parallel line (10) and the second set (7.2) is connected to a second parallel line (11),
wherein the inductive elements sets (7.1; 7.2) are mounted on at least two separate magnetic cores (6);
providing a number of operating modes of said PHF,
wherein a first operating mode is a half power mode (HPM) and a second operating mode is a full power mode (FPM);
providing the first operating mode, when an active power current is reduced more than 50% of a nominal value,
wherein the first operating mode comprising:
disconnecting one of at least two parallel lines (10) or (11) of the PHF via switching off the related adjustable rectifier (13) or (12) of the VFD, and
opening an adjustable contactor (17.1) of the storage elements set (4) of one of the disconnected line (10) or (11) of the PHF;
configuring the PHF to change the operating mode between at least two operating modes depending on the measured active power current and a supply voltage frequency value;
providing a step-disconnection/connection of the adjustable contactors (17.1; 17.2) of the capacitor sets (4.1, 4.2) during changing the operating modes.

6. The method according to claim 5, characterized with providing the second operating mode when the active power current is greater than 50% of the nominal value,
wherein providing precharging the storage elements sets (4) during the step-connection to the one of parallel lines (10) or (11).

7. The method according to claim 5, characterized with providing a third operating mode, when the active power is less than 30% of the nominal value.

8. The method according to claim 5, characterized with providing a fourth operating mode,
wherein the storage elements set (4) is forming to change the storing capacity depending on supply voltage frequency via connecting the second additional capacitor set (4.2) to the first capacitor set (4.1) of the storage elements set (4) via a second additional adjustable contactor (17.2) for switching the VFD supply voltage frequency from 60 Hz to 50 Hz.

9. The method of claim 5 or 7, wherein comprising a step of pre-charging a DC link (18) of the VFD in the third operating mode,
wherein the storage elements set (4) of at least one of parallel lines (10; 11) is switching out of the PHF circuit, via switching off the adjustable contactors (17.1) till reaching a setpoint of the VFD active power.

* * * * *